UNITED STATES PATENT OFFICE.

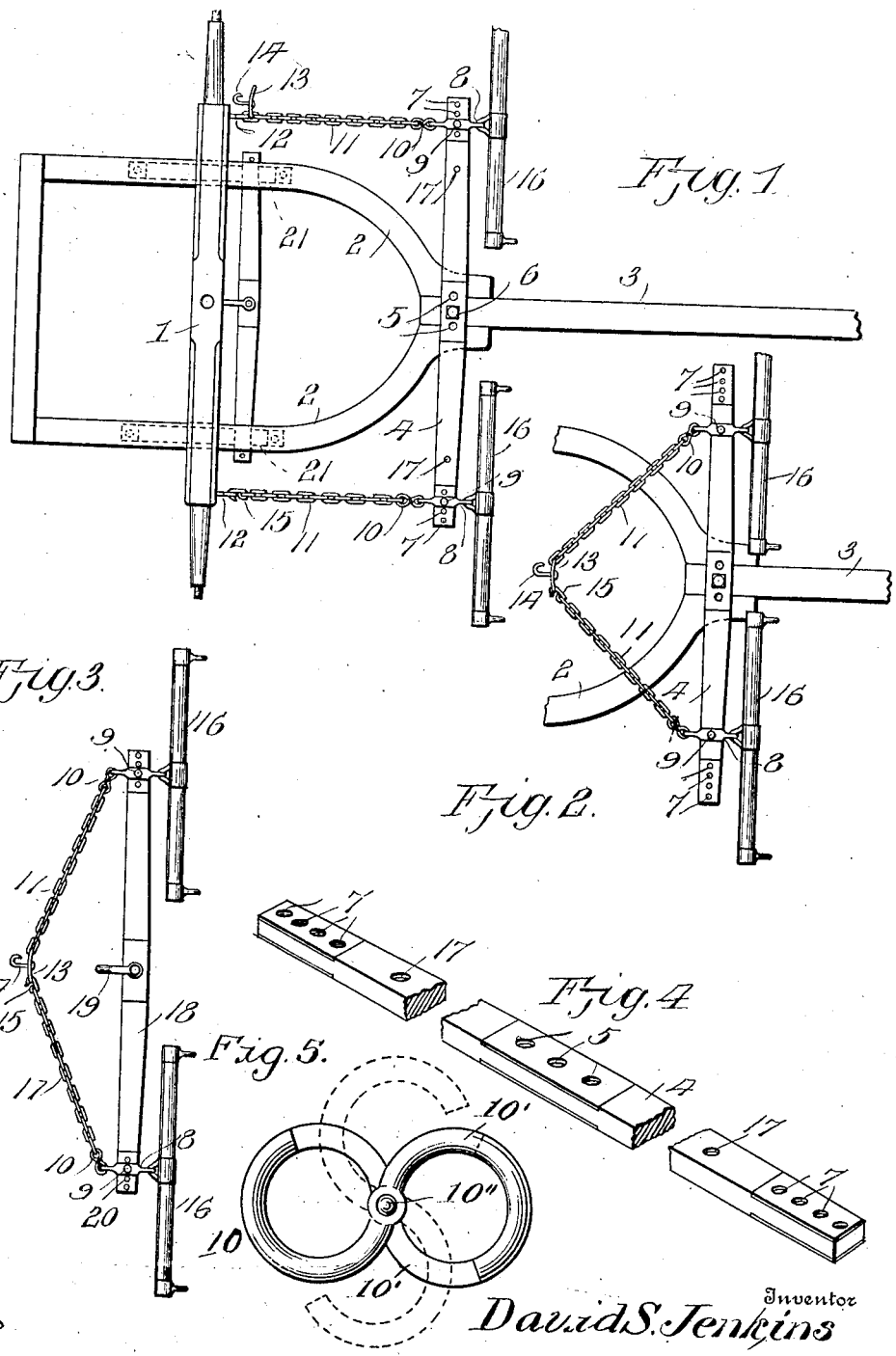

DAVID STONER JENKINS, OF ELIZABETHTON, TENNESSEE.

DRAFT APPLIANCE.

No. 892,843.     Specification of Letters Patent.     Patented July 7, 1908.

Application filed August 17, 1907. Serial No. 388,997.

*To all whom it may concern:*

Be it known that I, DAVID STONER JENKINS, a citizen of the United States, residing at Elizabethton, in the county of Carter and State of Tennessee, have invented new and useful Improvements in Draft Appliances for Wagons, Plows, and the Like, of which the following is a specification.

This invention relates to a draft device which is especially designed for use interchangeably on wagons, plows and other agricultural instruments, or for use in snaking out logs and for similar purposes.

The invention has for one of its objects to improve and simplify the construction of devices of this character so as to be conveniently changed over from one use to another, highly efficient in use and of durable and substantial design.

A further object of the invention is the provision of a draft device comprising a double tree having stay chains which latter can be attached to the double tree at different points or entirely removed according to the work to be done, the swingle trees being adjustably and removably connected with the double tree for equalizing the draft.

A still further object of the invention is the employment in connection with the draft device of the character referred to, of an auxiliary double tree in the nature of a stretcher bar which can be substituted for the main double tree when it is desired to use the draft device for plowing or for logging.

With these and other objects in view, as will appear as the description proceeds, the invention comprises the various novel features of construction and arrangement of parts, which will be more fully described hereinafter and set forth with particularity in the appended claims.

In the accompanying drawing, which illustrates one of the embodiments of the invention:—Figure 1 is a plan view of parts of the front portion of the running gear for a wagon showing the improved draft device applied thereto. Fig. 2 is a similar view showing the drafts adjusted to a different position. Fig. 3 is a plan view of the draft devices in which the auxiliary stretcher bar is substituted for the main double tree. Fig. 4 is a perspective view of the double tree with portions broken away. Fig. 5 is a view of a fastening of the stay chains.

Corresponding parts in the several figures are denoted by like characters of reference.

Referring to the drawing, 1 designates the front axle of a vehicle that supports hounds 2 and which latter are attached to a tongue 3. On the tongue is a double tree 4 of any approved construction that is provided at its center with a plurality of spaced apertures 5 for receiving a bolt 6 on which the double tree oscillates, the said apertures permitting of the double tree to be adjusted for varying the relative lengths of the arm to give the weaker horse the advantage. The outer ends of the double tree have spaced apertures 7 and applied to the ends of the double tree are double clevises 8 that are adjustably fastened by bolts 9 passing therethrough and through any of the apertures 7 thereby permitting the swingle trees to be adjustable inwardly or outwardly with respect to the pivot bolt 6 for changing the leverage. Detachably connected to the rear ends of the clevises 8 by hooks or fastenings 10 are stay chains 11 that have their rear ends fastened to the axle 1 by hooks 12 carried by the axle. Each fastening 10 consists of two outwardly disposed S-shaped hooks 10' connected by a pivot 10'', as shown in Fig. 5. On one of the chains is a plate 13 that is provided with a swiveled hook 14 there being a hook 15 that is adapted to be hooked to the plate 13 when the chains are detached from the axle for adapting the draft device for use in logging operations. To the front side of the clevises are attached swingle trees of ordinary construction.

Normally the parts are applied to the wagon as shown in Fig. 1, it being assumed that the draft of each horse is the same. Should one horse be weaker than the other the clevis 8 attaching the swingle tree of such horse to the double tree can be moved outwardly or the pivoting of the double tree changed to increase the leverage of the horse which is the weaker.

In case it is desired to use the draft device for snaking out logs or placing logs on a wagon the double tree can be used as a stretcher bar, the clevises being moved inwardly, and the bolts 9 inserted in openings 17 suitably located inwardly from the ends of the double tree. The stay chains 11 are unfastened from the axle and the ends of the chains connected together by the hook carrying plate 13. The double tree can then be removed from the wagon and the horses employed for drawing logs by means of a chain attached to the hook 14 of the stay chain.

It will thus be seen that the double tree can be used for two purposes. If desired a separate stretcher bar may be utilized for logging purposes or for plowing, the stretcher bar 18 being in the form of an auxiliary double tree which has a central clevis 19 and at the ends of the stretcher bar are apertures 20 for receiving the bolts 9 for connecting the double clevises 8 adjustably to the stretcher bar.

The stay chains 11 are hooked together as before described and the draft device is then ready for use in snaking out logs or for similar purposes. By detaching the stay chains the clevis 19 can be attached directly to the beam of a plow as will be readily understood. The stretcher bar 18 can be placed on the wagon by supporting the same on the hounds as shown in Fig. 1 the ends of the stretcher bar being engaged between the hounds and irons 21, as shown by dotted lines in Fig. 1. It will thus be seen that a draft device is provided that can be interchangeably used in a variety of ways.

From the foregoing description taken in connection with the accompanying drawing, the advantages of the construction and method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made when desired as are within the scope of the claims.

Having thus described the invention what is claimed as new, is:—

1. The combination of a running gear including an axle and a tongue, and fastenings on the axle, with a convertible draft appliance consisting of a bar removably mounted on the tongue and provided with apertures at its ends, double clevises on the ends of the bar, pins passing through the clevises and apertures for adjustably mounting the clevises on the bar, swingle-trees attached to the front ends of the clevises, chains removably connected with the rear ends of the clevises and having their rear ends attached to the fastenings on the axle, and a device permanently secured to one of the chains and adapted to be connected with the other chain when the draft appliance is to be used detached from the running gears.

2. In a draft appliance, the combination of a double tree having spaced apertures at the ends and one or more apertures located intermediate the ends and middle, clevises assembled over the ends of the double tree and slidable inwardly to the last-mentioned apertures, means engaging in any of the apertures for adjustably connecting the clevises to the double tree, stay chains, means for detachably connecting the stay chains to the clevises, a member fixedly secured to one of the chains, a swiveled hook extending from the middle portion of the member, and means detachably connecting the member with the other chain.

In testimony whereof I affix my signature in presence of two witnesses.

DAVID STONER JENKINS.

Witnesses:
J. K. VAUGHT,
J. A. ROBERSON.